(12) United States Patent
Carlson

(10) Patent No.: US 9,118,047 B2
(45) Date of Patent: *Aug. 25, 2015

(54) BATTERIES UTILIZING CATHODE COATINGS DIRECTLY ON NANOPOROUS SEPARATORS

(75) Inventor: Steven Allen Carlson, Cambridge, MA (US)

(73) Assignee: Optodot Corporation, Woburn, MA (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/302,760

(22) Filed: Nov. 22, 2011

(65) Prior Publication Data

US 2012/0064404 A1 Mar. 15, 2012

Related U.S. Application Data

(63) Continuation-in-part of application No. PCT/US2010/001536, filed on May 26, 2010, and a continuation-in-part of application No. PCT/US2010/001537, filed on May 26, 2010, and a continuation-in-part of application No. PCT/US2010/001539, filed on May 26, 2010, and a continuation-in-part of application No. PCT/US2010/001535, filed on May 26, 2010.

(60) Provisional application No. 61/217,132, filed on May 26, 2009.

(51) Int. Cl.
| | |
|---|---|
| *H01M 4/02* | (2006.01) |
| *H01M 4/04* | (2006.01) |
| *H01M 2/16* | (2006.01) |
| *H01M 4/64* | (2006.01) |
| *H01M 10/42* | (2006.01) |
| *H01M 6/16* | (2006.01) |
| *H01M 10/052* | (2010.01) |
| *H01M 4/136* | (2010.01) |

(52) U.S. Cl.
CPC ............ *H01M 4/0421* (2013.01); *H01M 2/166* (2013.01); *H01M 4/64* (2013.01); *H01M 10/4235* (2013.01); *H01M 4/136* (2013.01); *H01M 6/16* (2013.01); *H01M 10/052* (2013.01); *Y02T 10/7011* (2013.01); *Y10T 29/4911* (2015.01); *Y10T 29/49115* (2015.01)

(58) Field of Classification Search
CPC ......... H01M 2/16; H01M 2/166; H01M 4/64; H01M 10/4235; H01M 6/16; H01M 10/052; H01M 4/136; Y10T 29/49115; Y10T 29/4911
USPC ............................................ 429/211, 251, 58
See application file for complete search history.

(56) References Cited

U.S. PATENT DOCUMENTS

| | | | |
|---|---|---|---|
| 3,625,771 | A | 12/1971 | Arrance et al. |
| 3,647,554 | A | 3/1972 | Arrance et al. |

(Continued)

FOREIGN PATENT DOCUMENTS

| | | |
|---|---|---|
| CA | 2605874 | 1/2007 |
| EP | 0143562 A1 | 6/1985 |

(Continued)

*Primary Examiner* — Gary Harris
(74) *Attorney, Agent, or Firm* — Finch & Maloney PLLC

(57) ABSTRACT

Provided is a separator/cathode assembly for use in an electric current producing cell, wherein the assembly comprises a cathode current collector layer interposed between a first cathode layer and a second cathode layer and a porous separator layer on the side of the first cathode layer opposite to the cathode current collector layer, wherein the first cathode layer is coated directly on the separator layer. Also provided are methods of preparing such separator/cathode assemblies.

19 Claims, 1 Drawing Sheet

NOT TO SCALE

(56) References Cited

U.S. PATENT DOCUMENTS

| | | | |
|---|---|---|---|
| 5,162,175 A | 11/1992 | Visco et al. |
| 5,194,341 A | 3/1993 | Bagley et al. |
| 5,314,765 A | 5/1994 | Bates |
| 5,326,391 A | 7/1994 | Anderson et al. |
| 5,350,645 A | 9/1994 | Lake et al. |
| 5,415,954 A | 5/1995 | Gauthier et al. |
| 5,418,091 A | 5/1995 | Gozdz et al. |
| 5,439,760 A | 8/1995 | Howard et al. |
| 5,549,717 A | 8/1996 | Takeuchi et al. |
| 5,569,520 A | 10/1996 | Bates |
| 5,597,659 A | 1/1997 | Morigaki et al. |
| 5,691,005 A | 11/1997 | Morigaki et al. |
| 5,731,104 A | 3/1998 | Ventura et al. |
| 5,778,515 A | 7/1998 | Menon |
| 5,824,434 A | 10/1998 | Kawakami et al. |
| 5,840,087 A | 11/1998 | Gozdz et al. |
| 5,882,721 A | 3/1999 | Delnick |
| 5,894,656 A | 4/1999 | Menon et al. |
| 5,948,464 A | 9/1999 | Delnick |
| 6,148,503 A | 11/2000 | Delnick et al. |
| 6,153,337 A | 11/2000 | Carlson et al. |
| 6,162,563 A | 12/2000 | Miura et al. |
| 6,183,901 B1 | 2/2001 | Ying et al. |
| 6,194,098 B1 | 2/2001 | Ying et al. |
| 6,268,087 B1 | 7/2001 | Kim et al. |
| 6,277,514 B1 | 8/2001 | Ying et al. |
| 6,287,720 B1 | 9/2001 | Yamashita et al. |
| 6,306,545 B1 | 10/2001 | Carlson et al. |
| 6,328,770 B1 | 12/2001 | Gozdz |
| 6,344,293 B1 | 2/2002 | Geronov |
| 6,410,182 B1 | 6/2002 | Ying et al. |
| 6,423,444 B1 | 7/2002 | Ying et al. |
| 6,451,484 B1 | 9/2002 | Han et al. |
| 6,488,721 B1* | 12/2002 | Carlson ..................... 29/623.5 |
| 6,497,780 B1 | 12/2002 | Carlson |
| 6,723,467 B2 | 4/2004 | Yoshida et al. |
| 6,811,928 B2 | 11/2004 | Aihara et al. |
| 7,014,948 B2 | 3/2006 | Lee et al. |
| 7,066,971 B1 | 6/2006 | Carlson |
| 7,070,632 B1 | 7/2006 | Visco et al. |
| 7,081,142 B1 | 7/2006 | Carlson |
| 7,115,339 B2 | 10/2006 | Nakajima et al. |
| 7,160,603 B2 | 1/2007 | Carlson |
| 7,378,185 B2 | 5/2008 | Fujikawa et al. |
| 7,396,6516 B2 | 7/2008 | Ohata et al. |
| 7,402,184 B2 | 7/2008 | Ikuta et al. |
| 7,419,743 B2 | 9/2008 | Fujikawa et al. |
| 7,422,825 B2 | 9/2008 | Inoue et al. |
| 7,470,488 B2 | 12/2008 | Lee et al. |
| 7,560,193 B2 | 7/2009 | Ikuta et al. |
| 7,575,606 B2 | 8/2009 | Fukumoto et al. |
| 7,595,130 B2 | 9/2009 | Kawabata et al. |
| 7,638,230 B2 | 12/2009 | Fujita et al. |
| 7,638,241 B2 | 12/2009 | Lee et al. |
| 7,662,517 B2 | 2/2010 | Lee et al. |
| 7,674,559 B2 | 3/2010 | Min et al. |
| 7,682,740 B2 | 3/2010 | Yong et al. |
| 7,682,751 B2 | 3/2010 | Kato et al. |
| 7,687,202 B2 | 3/2010 | Nishino et al. |
| 7,695,870 B2 | 4/2010 | Park et al. |
| 7,704,641 B2 | 4/2010 | Yong et al. |
| 7,709,152 B2 | 5/2010 | Kim et al. |
| 7,709,153 B2 | 5/2010 | Lee et al. |
| 7,745,042 B2 | 6/2010 | Fujino et al. |
| 7,754,375 B2 | 7/2010 | Fujikawa et al. |
| 7,754,377 B2 | 7/2010 | Ohata et al. |
| 7,758,998 B2 | 7/2010 | Ohata et al. |
| 7,759,004 B2 | 7/2010 | Ikuta et al. |
| 7,811,700 B2 | 10/2010 | Hennige et al. |
| 7,816,038 B2 | 10/2010 | Ohata et al. |
| 7,829,242 B2 | 11/2010 | Hörpel et al. |
| 2001/0000485 A1 | 4/2001 | Ying et al. |
| 2001/0038938 A1 | 11/2001 | Takahashi et al. |
| 2001/0053475 A1 | 12/2001 | Ying et al. |
| 2002/0092155 A1 | 7/2002 | Carlson et al. |
| 2002/0141029 A1 | 10/2002 | Carlson et al. |
| 2003/0035995 A1 | 2/2003 | Ohsaki et al. |
| 2003/0118910 A1 | 6/2003 | Carlson |
| 2003/0171784 A1 | 9/2003 | Dodd et al. |
| 2004/0038090 A1 | 2/2004 | Faris |
| 2004/0043295 A1 | 3/2004 | Rodriguez et al. |
| 2004/0185335 A1 | 9/2004 | Carlson |
| 2004/0188880 A1 | 9/2004 | Bauer et al. |
| 2004/0241540 A1 | 12/2004 | Tsutsumi et al. |
| 2005/0221190 A1 | 10/2005 | Sudano et al. |
| 2005/0266305 A1 | 12/2005 | Ohata et al. |
| 2006/0008698 A1 | 1/2006 | Kim et al. |
| 2006/0127753 A1 | 6/2006 | Nakashima et al. |
| 2006/0172158 A1 | 8/2006 | Min et al. |
| 2006/0172185 A1 | 8/2006 | Mimura |
| 2006/0177732 A1 | 8/2006 | Visco et al. |
| 2006/0222954 A1 | 10/2006 | Skotheim et al. |
| 2006/0275661 A1 | 12/2006 | Kim |
| 2007/0065714 A1 | 3/2007 | Hambitzer et al. |
| 2007/0108120 A1 | 5/2007 | Carlson |
| 2007/0110990 A1 | 5/2007 | Carlson |
| 2007/0111070 A1 | 5/2007 | Carlson |
| 2007/0178384 A1* | 8/2007 | Kajita et al. .................. 429/251 |
| 2007/0184350 A1 | 8/2007 | Kim et al. |
| 2007/0189959 A1 | 8/2007 | Carlson et al. |
| 2007/0190427 A1 | 8/2007 | Carlson et al. |
| 2007/0204458 A1 | 9/2007 | Fujita et al. |
| 2007/0243460 A1 | 10/2007 | Carlson et al. |
| 2007/0269714 A1 | 11/2007 | Watanabe et al. |
| 2008/0032197 A1* | 2/2008 | Horpel et al. ................. 429/224 |
| 2008/0166202 A1 | 7/2008 | Dunlap et al. |
| 2008/0182174 A1 | 7/2008 | Carlson et al. |
| 2009/0017380 A1* | 1/2009 | Honda et al. ............... 429/218.1 |
| 2009/0087728 A1 | 4/2009 | Less et al. |
| 2009/0246636 A1 | 10/2009 | Chiang et al. |
| 2010/0261065 A1 | 10/2010 | Babinec et al. |
| 2011/0281171 A1 | 11/2011 | Yong et al. |

FOREIGN PATENT DOCUMENTS

| | | |
|---|---|---|
| EP | 0523840 B1 | 1/1993 |
| EP | 0600718 B1 | 6/1994 |
| EP | 0814520 A2 | 12/1997 |
| EP | 083623891 | 4/1998 |
| EP | 0848435 B1 | 6/1998 |
| EP | 0875950 A2 | 11/1998 |
| EP | 0892449 A1 | 1/1999 |
| EP | 1156544 | 11/2011 |
| JP | H06140077 | 5/1994 |
| JP | H0927343 | 1/1997 |
| JP | H10214639 | 8/1998 |
| JP | 2011233144 A | 8/1999 |
| JP | 2002042882 | 2/2002 |
| JP | 2003223926 | 8/2003 |
| JP | 2005022674 A1 | 3/2005 |
| JP | 2005235695 | 9/2005 |
| JP | 2007258160 | 10/2007 |
| JP | 2008041404 | 2/2008 |
| JP | 2008123988 | 5/2008 |
| WO | 9102385 A1 | 2/1991 |
| WO | 9103080 A1 | 3/1991 |
| WO | 9931751 | 6/1996 |
| WO | 9933125 A1 | 7/1999 |
| WO | 9957770 A1 | 11/1999 |
| WO | 0076011 A | 12/2000 |
| WO | 0139293 | 5/2001 |
| WO | 2009014388 | 1/2009 |
| WO | 2009026467 A1 | 2/2009 |
| WO | 2010138176 | 12/2010 |
| WO | 2010138177 | 12/2010 |
| WO | 2010138179 | 12/2010 |
| WO | 2013146126 | 10/2013 |

* cited by examiner

NOT TO SCALE

NOT TO SCALE

US 9,118,047 B2

BATTERIES UTILIZING CATHODE COATINGS DIRECTLY ON NANOPOROUS SEPARATORS

RELATED APPLICATIONS

The present application is a continuation-in-part of and claims the benefit of and priority to PCT Application No. PCT/US2010/001536, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001537, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001539, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001535, filed May 26, 2010, which claims the benefit under 35 U.S.C. §119(e) of U.S. Provisional Patent Application No. 61/217,132, filed May 26, 2009. The entireties of each of the above-referenced patent applications are incorporated herein by reference.

FIELD OF THE INVENTION

The present invention relates generally to the field of batteries and other electric current producing cells. This invention pertains to lithium batteries that utilize nanoporous separators and to methods of preparing lithium batteries by taking advantage of the nanoporous structure of the separator to overlay the other layers of the battery in a desired configuration. More particularly, the present invention pertains to separator/cathode assemblies for batteries where the cathode layer is coated directly on a porous separator layer and to methods of preparing such separator/cathode assemblies.

BACKGROUND OF THE INVENTION

Lithium batteries, including rechargeable or secondary lithium ion batteries, non-rechargeable or primary lithium batteries, and other types such as lithium-sulfur batteries, are typically made by interleaving a plastic separator, a conductive metal substrate with a cathode layer coated on both sides, another plastic separator, and another conductive metal substrate with an anode layer coated on both sides. To maintain the alignment of the strips of these materials and for other quality reasons, this interleaving is usually done on automatic equipment, which is complex and expensive. Also, in order to achieve sufficient mechanical strength and integrity, the separators and the metal substrates are relatively thick, such as 10 microns in thickness or more. For example, a typical thickness of the copper metal substrate for the anode coating layers is 10 microns, a typical thickness of the aluminum metal substrate for the cathode coating layers is 12 microns, and the plastic separators typically have thicknesses ranging from 12 to 20 microns. These thick separators and metal substrates are not electrochemically active and thus lower the volume of the electroactive material in the electrodes of the lithium batteries. This limits the energy density and power density of the lithium batteries.

Among the new applications for lithium batteries are high power batteries for hybrid, plug-in hybrid, and electric vehicles. In contrast to the cylindrical metal cells used in lithium batteries for portable computers and other applications, many of the lithium batteries for vehicles are of a flat or prismatic design. Also, the lithium batteries for vehicles need to be economical. Potential approaches to make higher energy and more economical lithium batteries for vehicles and other applications include greatly increasing the proportion or percentage of the volume of the electroactive material in each battery and reducing the complexity and expense of the automated equipment to fabricate the battery.

It would be advantageous if a lithium battery comprised separator and metal substrate layers that were much thinner than are currently used with either or both of its cathode and anode layers and thereby had a greater content of electroactive material. It would be particularly advantageous if this lithium battery could be fabricated on less complex and less expensive automated processing equipment than, for example, the winding equipment utilized for portable computer batteries, and furthermore was particularly adapted for making flat or prismatic batteries.

SUMMARY OF THE INVENTION

This invention pertains to lithium and other batteries and to separator/cathode assemblies for lithium and other batteries that utilize nanoporous separators, particularly heat resistant separators with dimensional stability at temperatures at and above 200° C., and to methods of preparing lithium batteries and separator/cathode assemblies, by taking advantage of the nanoporous structure of the separator layer to coat the other layers of the battery in a desired thickness and configuration directly on the porous separator layer.

One aspect of this invention pertains to a separator/cathode assembly for use in an electric current producing cell, wherein the assembly comprises a cathode current collector layer interposed between a first cathode layer and a second cathode layer and a porous separator layer on the side of the first cathode layer opposite to the cathode current collector layer, wherein the first cathode layer is coated directly on the separator layer. In one embodiment of the separator/cathode assembly, no separator layer is coated directly on the second cathode layer. In one embodiment, the surface of the first cathode layer adjacent to the top surface of the separator layer has a contour matching the contour of the top surface of the separator layer, and the contour of the top surface of the separator layer is the same as before the coating of the first cathode layer directly on the separator layer.

In one embodiment of the separator/cathode assemblies of this invention, the first cathode layer comprises cathode particles selected from the group consisting of electroactive particles and electrically conductive particles, and the cathode particles are not present in the separator layer. In one embodiment, the separator layer comprises separator particles, and the separator particles are not present in the first cathode layer. In one embodiment, the separator particles are selected from the group consisting of inorganic oxide particles, inorganic nitride particles, inorganic carbonate particles, inorganic sulfate particles, and polymer particles.

In one embodiment of the separator/cathode assemblies of the present invention, the cathode current collector layer of the assembly comprises an aluminum layer. In one embodiment, the thickness of the aluminum layer is less than 3 microns.

In one embodiment of the separator/cathode assemblies of this invention, the separator layer comprises pores having an average pore diameter of less than 0.2 microns, and preferably less than 0.1 microns. In one embodiment, the separator layer has a thickness of less than 9 microns, and preferably less than 6 microns. In one embodiment, the separator comprises a porous layer comprising aluminum boehmite.

Another aspect of the present invention pertains to methods of making a separator/cathode assembly for use in an electric current producing cell comprising the steps of (a) providing a porous separator layer; (b) coating a first cathode layer directly on the separator layer; and (c) coating one or more cathode current collector layers directly on the first cathode layer to make the separator/cathode assembly. In one embodiment, after step (c), there is a further step (d) of coating a second cathode layer directly on the one or more current collector layers. In one embodiment, step (a) comprises coating a porous separator on a substrate. In one embodiment, the substrate is a release substrate, and, after step (c), there is a further step (d) of delaminating the substrate from the separator layer to form the separator/cathode assembly. In one embodiment, after step (c) and prior to step (d), there is a further step of coating a second cathode layer directly on the one or more cathode current collector layers. In one embodiment, the substrate is a porous substrate. In one embodiment, the porous substrate is selected from the group consisting of porous polymer films and porous non-woven polymer fiber substrates.

In one embodiment of the methods of preparing separator/cathode assemblies of this invention, the one or more cathode current collector layers of step (c) comprises a metal layer and the thickness of the metal layer is less than 3 microns. In one embodiment, the separator layer comprises pores having an average pore diameter of less than 0.2 microns, and preferably of less than 0.1 microns. In one embodiment, the separator layer has a thickness of less than 9 microns, and preferably less than 6 microns.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

DETAILED DESCRIPTION OF THE INVENTION

Figure 1:
FIG. 1 shows a cross-section view of a separator/cathode assembly after one version of the steps to make a separator/cathode assembly.

The separator/cathode assemblies and methods of preparing separator/cathode assemblies of the present invention provide a flexible and effective approach to separator/cathode assemblies and to lithium and other batteries incorporating such separator/cathode assemblies, to provide lithium and other batteries with higher energy and power densities and with lower manufacturing and capital equipment costs.

One aspect of this invention pertains to a separator/cathode assembly for use in an electric current producing cell, wherein the assembly comprises a cathode current collector layer interposed between a first cathode layer and a second cathode layer and a porous separator layer on the side of the first cathode layer opposite to the cathode current collector layer, wherein the first cathode layer is coated directly on the separator layer. In one embodiment of the separator/cathode assembly, no separator layer is coated directly on the second cathode layer. In one embodiment, the surface of the first cathode layer adjacent to the top surface of the separator layer has a contour matching the contour of the top surface of the separator layer, and the contour of the top surface of the separator layer is the same as before the coating of the first cathode layer directly on the separator layer.

As used herein, the word "battery" pertains to both a single electric current producing cell and to multiple electric current producing cells combined in a casing or pack. As used herein, the term "lithium battery" refers to all types of lithium batteries known in the art, including, but not limited to, rechargeable or secondary lithium ion batteries, non-rechargeable or primary lithium batteries, and other types such as lithium-sulfur batteries.

As used herein, the term "current collector layer" refers to one or more current collection layers that are adjacent to an electrode layer. This includes, but is not limited to, a single conductive metal layer or substrate and a single conductive metal layer or substrate with an overlying conductive coating layer, such as a carbon black-based polymer coating layer. Examples of a metal substrate as the current collector are a metal substrate comprising aluminum, which is typically used as the current collector and substrate for the positive electrode or cathode layer, and a metal substrate comprising copper, which is typically used as the current collector and substrate for the negative electrode or anode layer. The cathode current collector layer may comprise an electrically conductive material selected from the group consisting of electrically conductive metals including metal pigments or particles, electrically conductive carbons including carbon black and graphite pigments, and electrically conductive polymers. These electrically conductive materials may be combined with an organic polymer for added mechanical strength and flexibility to form the cathode current collector layer.

As used herein, the term "electrode layer" refers to a layer of the cell that comprises electroactive material. When the electrode layer is where the lithium is present in the case of primary lithium batteries or, in the case of rechargeable lithium batteries, is formed during the charging of the battery and is oxidized to lithium ions during the discharging of the battery, the electrode layer is called the anode or negative electrode. The other electrode of opposite polarity is called the cathode or positive electrode. Any of the electroactive materials that are useful in lithium batteries may be utilized in the electrode layers of this invention. Examples include, but are not limited to, lithium cobalt oxide, lithium manganese oxide, lithium iron phosphate, and sulfur as electroactive materials in the cathode layers and lithium titanate, lithium metal, lithium-intercalated graphite, and lithium-intercalated carbon as electroactive materials in the anode layers.

As used herein, the word "electrolyte" refers to any of the electrolytes that are useful in lithium batteries. Suitable electrolytes include, but are not limited to, liquid electrolytes, gel polymer electrolytes, and solid polymer electrolytes. Suitable liquid electrolytes include, but are not limited to, $LiPF_6$ solutions in a mixture of organic solvents, such as, for example, a mixture of ethylene carbonate, propylene carbonate, and ethyl methyl carbonate.

Figure 2:
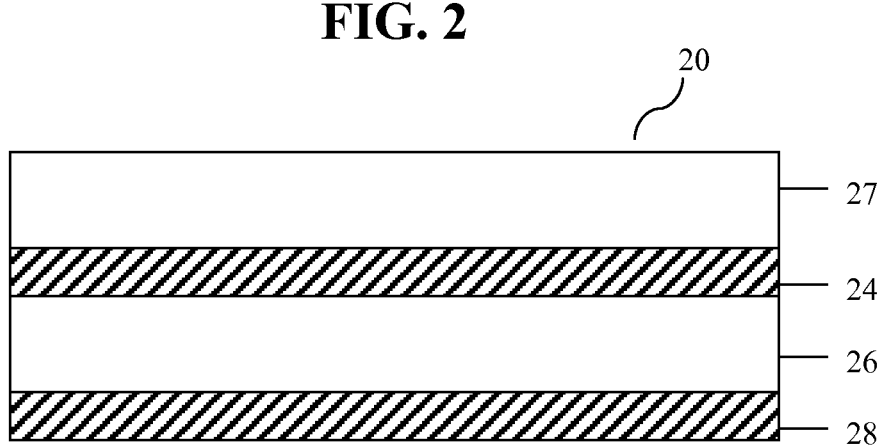
FIG. 2 shows a cross-section view of a separator/cathode assembly after another version of the steps to make a separator/cathode assembly.

FIG. 1 shows an example of a cross-section view (not to scale) of one version of a separator/cathode assembly 10 of the present invention with first cathode layer 16 interposed between current collector layer 14 and porous separator layer 18. FIG. 2 shows an example of a cross-section view (not to scale) of another version of a separator/cathode assembly 20 of this invention with a current collector layer 24 interposed between a first cathode layer 26 and a second cathode layer 27 and with a porous separator layer 28 on the side of the first cathode layer 26 opposite to the current collector layer 24.

In one embodiment of the separator/cathode assemblies of the present invention, the first cathode layer comprises cathode particles selected from the group consisting of electroactive particles and electrically conductive particles, and the cathode particles are not present in the separator layer. In one embodiment, the separator layer comprises separator particles, and the separator particles are not present in the first cathode layer. In one embodiment, the separator particles are selected from the group consisting of inorganic oxide particles, inorganic nitride particles, inorganic carbonate particles, inorganic sulfate particles, and polymer particles.

In one embodiment of the separator/cathode assemblies of this invention, the separator layer comprises pores with an average pore diameter of less than 0.2 microns, and preferably less than 0.1 microns. In one embodiment, the separator layer has a pore diameter of less than 0.2 microns, and preferably less than 0.1 microns. In one embodiment, the separator layer has a thickness of less than 9 microns, and preferably less than 6 microns. In one embodiment, the porous separator layer comprises a xerogel layer or xerogel membrane. In one embodiment, the porous separator layer comprises aluminum boehmite. In one embodiment, the separator layer is a heat resistant separator layer with dimensional stability at 200° C. and higher.

By the term "xerogel layer", as used herein, is meant a porous layer that was formed by a xerogel or sol gel process of drying a colloidal sol liquid to form a solid gel material. By the term "xerogel membrane", as used herein, is meant a membrane that comprises at least one layer comprising a xerogel layer where the pores of the xerogel layer are continuous from one side of the layer to the other side of the layer. Xerogel layers and membranes typically comprise inorganic oxide materials, such as aluminum oxides, aluminum boehmites, and zirconium oxides, as the sol gel materials. Examples of suitable xerogel membranes for the present invention include, but are not limited to, xerogel membranes described in U.S. Pat. Nos. 6,153,337 and 6,306,545 to Carlson et al. and U.S. Pat. Nos. 6,488,721 and 6,497,780 to Carlson.

Examples of suitable separator coating layers for the present invention include, but are not limited to, the separator coatings described in U.S. Pat. Nos. 6,153,337 and 6,306,545 to Carlson et al. and U.S. Pat. Nos. 6,488,721 and 6,497,780 to Carlson. These separator coatings may be coated from an aqueous mix or a solvent mix onto a variety of substrates, such as, for example, silicone-treated plastic and paper substrates, polyester film substrates, polyolefin-coated papers, and metal substrates, and, alternatively, porous substrates such as, for example, porous plastic films and porous nonwoven polymer fiber substrates. The advantages of coating the separator onto a substrate for this invention include, but are not limited to, (a) that the other layers of the lithium battery may be coated or laminated overlying this separator coating layer and then subsequently the substrate may be removed by delaminating to provide a dry stack of battery layers, or, alternatively, the substrate may be porous and may be used without any delaminating step, (b) the coating process for the separator layer lends itself to making thinner separators than are typically available from an extrusion process for the separator, and (c) the coated separator layer may be nanoporous with pore diameters of less than 0.1 microns that are too small to allow any penetration of the particles of the electrode and other overlying coating layers into the separator layer. Even separator layers with pore diameters up to 0.2 microns have been found to prevent the penetration into the separator layer of any particles of carbon black pigments as are typically used in lithium batteries.

The electrode coating layer may be coated on the full surface of the separator layer, or in lanes or strips on the separator layer, or in patches or rectangle shapes on the separator layer, depending on the requirements of the end use and the specific approach to doing the current collection from the layers of each electrode without having a short circuit due to contacting any layers of the electrode and current collector of opposite polarity. Cathode coating layers typically are coated from a pigment dispersion comprising an organic solvent, such as N-methyl pyrrolidone (NMP), and contain the electroactive or cathode active material in a pigment or particle form, a conductive carbon pigment, and an organic polymer. Anode coating layers typically are coated from a pigment dispersion comprising an organic solvent or water, and contain the electroactive or anode active material in a pigment or particle form, a conductive carbon pigment, and an organic polymer. These electrode pigments are particles with diameters typically greater than 0.1 microns and often in the range of 0.5 to 5 microns.

However, both the cathode and anode layers may be coated in a separator/electrode assembly and those assemblies combined to form a dry separator/electrode cell. In this case, the separator layer may be present on all of the electrode layers to give a "double separator" layer between the cathode and anode layers or, alternatively, may be present on only one electrode side of the separator/electrode assembly.

In one embodiment of the separator/cathode assemblies of this invention, the cathode current collector layer comprises an aluminum layer. In one embodiment, the thickness of the aluminum layer is less than 3 microns.

For the current collector layer, alternatively, a conductive non-metallic layer, such as a carbon pigment coating, as known in the art of lithium batteries, may be coated before and/or after the deposition of the metal current collector layer in order to achieve improved current collection and battery efficiency, as well as providing some added mechanical strength and flexibility. The metal current collector layer may be much thinner than the typically 10 to 12 micron thick metal substrates used in lithium batteries. For example, the metal current collector layer may have a thickness of less than 3 microns, and may be as thin as about 1 micron, such as in the range of 0.5 to 1.5 microns thick. This allows a higher proportion of electroactive material into the lithium battery, thereby enhancing the energy and power densities of the lithium battery. The metal current collector layer may be deposited by any of the metal deposition methods known in the art, such as by vacuum deposition in the case of aluminum layers.

In one embodiment of the separator/cathode assemblies of this invention, the cathode current collector layer is coated directly on the first cathode layer on the side opposite to said separator layer. In one embodiment, the cathode current collector layer comprises an electrically conductive material selected from the group consisting of electrically conductive metals including metal pigments or particles, electrically conductive carbons including carbon black and graphite pigments, and electrically conductive polymers. These electrically conductive materials may be combined with an organic polymer for added mechanical strength and flexibility to form the cathode current collector layer. In one embodiment, the cathode current collector layer comprises an aluminum layer. In one embodiment, the thickness of the aluminum layer is less than 3 microns. In one embodiment, the electrically conductive material comprises aluminum. In one embodiment, the cathode current collector layer comprises two or more layers coated directly on the first cathode layer and wherein at least one of the two or more current collector layers comprises an electrically conductive material comprising carbon.

In one embodiment of the separator/cathode assemblies of this invention, the thickness of the cathode current collector layer is less than 3 microns. In one embodiment, the thickness of the cathode current collector layer is from 0.5 to 1.5 microns. In one embodiment, the second cathode layer is coated directly on the cathode current collector layer on the side opposite to the first cathode layer.

Another aspect of the present invention pertains to a battery comprising a separator/cathode assembly, wherein the assembly comprises a cathode current collector layer interposed between a first cathode layer and a second cathode layer and a porous separator layer on the side of the first cathode layer opposite to the cathode current collector layer, wherein the first cathode layer is coated directly on the separator layer. In one embodiment, the battery is a lithium battery.

Another aspect of the present invention pertains to methods of making a separator/cathode assembly for use in an electric current producing cell comprising the steps of (a) providing a porous separator layer; (b) coating a first cathode layer directly on the separator layer; and (c) coating one or more cathode current collector layers directly on the first cathode layer to make the separator/cathode assembly. In one embodiment, after step (c), there is a further step (d) of coating a second cathode layer directly on the one or more current collector layers. In one embodiment, step (a) comprises coating a porous separator layer on a substrate.

In one embodiment, the substrate is a release substrate, and, after step (c), there is a further step (d) of delaminating the substrate from the separator layer to form the separator/cathode assembly. In one embodiment, after step (c) and prior to step (d), there is a further step of coating a second cathode layer directly on the one or more cathode current collector layers. In one embodiment, the substrate is a porous substrate. In one embodiment, the porous substrate is selected from the group consisting of porous polymer films and porous nonwoven polymer fiber substrates.

Examples of a porous substrate include, but are not limited to, porous polyethylene films and porous polypropylene films such as, for example, are sold under the trade name of CELGARD by Polypore, Inc., Charlotte, N.C. In order to minimize the overall thickness of the separator layer, the porous substrate may be 5 to 12 microns in thickness and the porous separator layer coated on the porous substrate may be 2 to 10 microns in thickness. If the porous substrate has sufficient mechanical strength to be handled on the coating equipment as a free standing film or by the use of a temporary release liner and has the properties needed for a lithium battery separator, the use of a porous substrate in step (a) eliminates the need for a later delamination step because the porous substrate becomes a layer of the battery and functions as a separator. The porous separator layer coated directly on the porous substrate has the benefits of providing a layer of very small pores that prevents the penetration of any of the particles of the electrode layer directly coated on it and, if a heat resistant separator layer comprising aluminum boehmite or another non-melting material is used, has the added benefits of providing a safer and more heat resistant separator with dimensional stability at and above 200° C.

In one embodiment of the methods of preparing separator/cathode assemblies of this invention, the one or more cathode current collector layers of step (c) comprise a metal layer and the thickness of the metal layer is less than 3 microns. In one embodiment, the separator layer comprises pores having an average pore diameter of less than 0.2 microns, and preferably less than 0.1 microns. In one embodiment, the separator layer has a thickness of less than 9 microns, and preferably less than 6 microns.

FIG. 1 shows an example of a cross-section view (not to scale) of one version of a separator/cathode assembly 10 of this invention after steps (a), (b), and (c). Separator/cathode assembly 10 comprises a porous separator layer 18, a first cathode layer 16, and a current collector layer 14. FIG. 2 shows an example of a cross-section view (not to scale) of another version of a separator/cathode assembly 20 of the present invention after steps (a), (b), (c), and (d) of coating a second cathode layer. Separator/cathode assembly 20 comprises a porous separator layer 28, a first cathode layer 26, a current collector layer 24, and a second cathode layer 27.

In one embodiment of the methods of preparing separator/cathode assemblies of this invention, the one or more current collector layers of step (c) comprise a metal layer and the thickness of the metal layer is less than 3 microns, and preferably is about 1 micron, such as in the range of 0.5 to 1.5 microns. In one embodiment, the separator layer comprises pores having an average pore diameter of less than 0.2 microns, and preferably less than 0.1 microns. In one embodiment, the separator layer has a thickness of less than 9 microns, and preferably less than 6 microns.

What is claimed is:

1. A separator/cathode assembly for use in an electric current producing cell, wherein said assembly comprises a cathode current collector layer interposed between a first cathode layer and a second cathode layer and a porous separator layer on the side of said first cathode layer opposite to said cathode current collector layer, wherein said first cathode layer is coated directly on said porous separator layer, there are no pores larger than 0.2 microns in diameter in said porous separator layer, the porous separator layer comprises a xerogel layer and said cathode current collector layer comprises a metal layer having a thickness of less than 3 microns.

2. The separator/cathode assembly of claim 1, wherein said first cathode layer comprises cathode particles selected from the group consisting of electroactive particles and electrically conductive particles, and wherein said cathode particles are not present in said separator layer.

3. The separator/cathode assembly of claim 1, wherein said separator layer comprises separator particles, and wherein said separator particles are not present in said first cathode layer.

4. The separator/cathode assembly of claim 3, wherein said separator particles are selected from the group consisting of inorganic oxide particles, inorganic nitride particles, inorganic carbonate particles, inorganic sulfate particles, and polymer particles.

5. The separator/cathode assembly of claim 1, wherein the thickness of said separator layer is less than 9 microns.

6. The separator/cathode assembly of claim 1, wherein said separator layer comprises aluminum boehmite.

7. The separator/cathode assembly of claim 1, wherein said separator layer is a heat resistant separator layer with dimensional stability at 200° C.

8. The separator/cathode assembly of claim 1, wherein said cathode current collector layer is coated directly on said first cathode layer on the side opposite to said separator layer.

9. The separator/cathode assembly of claim 8, wherein said cathode current collector layer comprises an electrically conductive material selected from the group consisting of electrically conductive metals, electrically conductive carbons, and electrically conductive polymers.

10. The separator/cathode assembly of claim 8, wherein said cathode current collector layer comprises two or more layers coated directly on said first cathode layer and wherein at least one of said two or more layers comprises an electrically conductive material comprising carbon.

11. The separator/cathode assembly of claim 1, wherein said second cathode layer is coated directly on said cathode current collector layer on a side opposite to said first cathode layer.

12. A method of making a separator/cathode assembly for use in an electric current producing cell comprising the steps of:
   (a) providing a porous separator layer comprising a xerogel layer and having no pores larger than 0.2 microns in diameter;
   (b) coating a first cathode layer directly on said porous separator layer; and
   (c) coating one or more cathode current collector layers directly on said first cathode layer to make said separator/cathode assembly, wherein at least one of said one or more cathode current collector layers comprises a metal layer having a thickness of less than 3 microns.

13. The separator/cathode assembly of claim 1, wherein said current collector layer has a thickness of between 0.5 and 1.5 microns.

14. The separator/cathode assembly of claim 1, wherein said first cathode layer is coated from a pigment dispersion comprising a cathode active material and an organic solvent.

15. The separator/cathode assembly of claim 14, wherein said cathode active material includes a conductive carbon pigment.

16. The separator/cathode assembly of claim 14, wherein said cathode active material is selected from the group consisting of lithium cobalt oxides, lithium manganese oxides and lithium iron phosphates.

17. The separator/cathode assembly of claim 1, wherein said separator layer has no pores larger than 0.1 microns in diameter.

18. The separator/cathode assembly of claim 1, wherein said second cathode layer is coated directly on said cathode current collector layer.

19. A separator/cathode assembly for use in an electric current producing cell, wherein said assembly comprises a cathode current collector layer interposed between a first cathode layer and a second cathode layer and a porous separator layer on the side of said first cathode layer opposite to said cathode current collector layer, wherein said first cathode layer is coated directly on said porous separator layer, said cathode current collector layer comprises a metal layer having a thickness of between 0.5 and 1.5 microns, said first cathode layer comprises a cathode active material selected from the group consisting of: lithium cobalt oxides, lithium manganese oxides and lithium iron phosphates, wherein there are no pores larger than 0.1 microns in diameter in said porous separator layer, the porous separator layer comprises a xerogel layer, and wherein said second cathode layer is coated directly on said cathode current collector layer.

* * * * *